United States Patent
Brügger et al.

(10) Patent No.: US 9,056,747 B2
(45) Date of Patent: Jun. 16, 2015

(54) LOAD MEASURING DEVICE FOR AN ELEVATOR INSTALLATION

(75) Inventors: Beat Brügger, Lucerne (CH); Christoph Schuler, Cham (CH); Lukas Zeder, Buchrain (CH); Thomas Wüest, Hochdorf (CH); Urs Schaffhauser, Root (CH); René Strebel, Sarmenstorf (CH)

(73) Assignee: Inventio AG, Hergiswil (CH)

( * ) Notice: Subject to any disclaimer, the term of this patent is extended or adjusted under 35 U.S.C. 154(b) by 239 days.

(21) Appl. No.: 13/228,710

(22) Filed: Sep. 9, 2011

(65) Prior Publication Data

US 2012/0061190 A1    Mar. 15, 2012

(30) Foreign Application Priority Data

Sep. 9, 2010   (EP) .................................... 10176011

(51) Int. Cl.
| | |
|---|---|
| *B66B 3/00* | (2006.01) |
| *G01G 3/14* | (2006.01) |
| *G01L 1/22* | (2006.01) |
| *B66B 1/34* | (2006.01) |
| *G01G 3/16* | (2006.01) |
| *G01G 19/18* | (2006.01) |

(52) U.S. Cl.
CPC .............. *B66B 1/3476* (2013.01); *B66B 1/3484* (2013.01); *G01G 3/16* (2013.01); *G01G 19/18* (2013.01)

(58) Field of Classification Search
CPC .. B66B 5/0006; B66B 5/0031; B66B 5/0037; Y10S 177/09
USPC .......... 187/281, 293, 393; 177/132, 142, 211; 73/862.625–862.633, 862.636–862.63
See application file for complete search history.

(56) References Cited

U.S. PATENT DOCUMENTS

| | | | | |
|---|---|---|---|---|
| 3,063,576 | A | * | 11/1962 | Hofmeister ...................... 414/21 |
| 3,290,931 | A | | 12/1966 | Fowkes at al. |
| 3,439,761 | A | * | 4/1969 | Laimins ......................... 177/211 |
| 3,443,652 | A | * | 5/1969 | Videon .......................... 177/136 |
| 3,603,418 | A | * | 9/1971 | Schmidt et al. ............... 177/136 |
| 4,078,623 | A | * | 3/1978 | Ohta et al. ....................... 177/45 |
| 4,102,031 | A | * | 7/1978 | Reichow et al. ................ 29/464 |

(Continued)

FOREIGN PATENT DOCUMENTS

| | | |
|---|---|---|
| EP | 0151949 B1 | 9/1987 |
| EP | 0427075 A2 | 5/1991 |

(Continued)

*Primary Examiner* — William E Dondero
*Assistant Examiner* — Minh Truong
(74) *Attorney, Agent, or Firm* — Fraser Clement Martin & Miller LLC; William J. Clemens (57) ABSTRACT

An elevator installation includes an elevator cage with a support construction carrying the elevator cage, wherein the support construction has two beams. Mounted on each beam is a positioning arrangement on which, for example, a sensor is positioned, which is part of a load measuring device, wherein the positioning arrangements have material structures or sensor carriers. The sensors detect a change in spacing of the material structures or of the sensor carriers from one another, wherein this change in spacing is caused by a change in loading of the elevator cage. Signals of the sensors are processed in an evaluating unit and a signal representing the loading is used in an elevator control.

10 Claims, 4 Drawing Sheets

(56) References Cited

U.S. PATENT DOCUMENTS

| | | | |
|---|---|---|---|
| 4,150,729 A * | 4/1979 | Ormond | 177/211 |
| 4,411,159 A * | 10/1983 | Spear et al. | 73/768 |
| 4,420,985 A * | 12/1983 | Raskin | 73/862.633 |
| 4,542,800 A * | 9/1985 | Knothe et al. | 177/211 |
| 4,611,678 A * | 9/1986 | Andriewsky | 177/211 |
| 4,744,429 A * | 5/1988 | Kellenbach | 177/211 |
| 4,785,673 A * | 11/1988 | Aumard | 73/862.632 |
| 5,327,791 A * | 7/1994 | Walker | 73/862.628 |
| 5,510,581 A * | 4/1996 | Angel | 177/211 |
| 5,786,549 A * | 7/1998 | Serizawa | 177/211 |
| 6,092,838 A * | 7/2000 | Walker | 280/735 |
| 6,305,503 B1 * | 10/2001 | Suzuki et al. | 187/393 |
| 6,443,266 B2 * | 9/2002 | Murakami et al. | 187/401 |
| 6,450,299 B1 * | 9/2002 | Lysaght | 187/393 |
| 6,647,797 B2 * | 11/2003 | Miodushevsky | 73/774 |
| 6,715,587 B2 * | 4/2004 | Sittler et al. | 187/401 |
| 2003/0172740 A1 | 9/2003 | Stevenson et al. | |
| 2008/0271954 A1 | 11/2008 | Fischer | |

FOREIGN PATENT DOCUMENTS

| | | |
|---|---|---|
| GB | 2055207 A | 2/1981 |
| WO | 01/83350 A1 | 11/2001 |

* cited by examiner

LOAD MEASURING DEVICE FOR AN ELEVATOR INSTALLATION

CROSS-REFERENCE TO RELATED APPLICATION

This application claims priority to European Patent Application No. 10176011.4, filed Sep. 9, 2010, which is incorporated herein by reference.

FIELD

This disclosure relates to load measuring in an elevator installation.

BACKGROUND

Known elevator installations, by way of example, generally consist of an elevator cage, a counterweight and a support means, which by way of a drive connects the elevator cage and the counterweight together. The elevator cage is moved in an elevator shaft by this drive by means of an elevator control. A measuring device which measures loading of the elevator cage is present in such an elevator installation. Such a load measuring device can serve the purpose of generating signals required for the elevator control and that are proportional to the load in order to avoid, for example, journeys with overload or unnecessary empty journeys. These load measuring devices are based on various principles.

WO 01/83350 describes a principle of a load measuring device for cable elevators, in which a single sensor generates a signal on the basis of the extent of deformation of a support carrying the elevator cage. The deformation of this support is caused by the total weight of the elevator cage. The resulting signal of the sensor is used as an input signal for an elevator control. A disadvantage of this principle can be that inaccuracies can arise caused by, for example, a temperature sensitivity of strain gauges employed in the individual sensor.

EP 0151949 B1 discloses a principle of a different load measuring device for elevator cages with strain gauges, in which such inaccuracies can be reduced. An elevator cage vertically guided in an elevator shaft is carried by a base frame with rectangular cross-section. Brackets onto which the cage floor is fastened are arranged at corners characterized by this cross-section. Loading of the cage floor leads to bending of a respective limb of these brackets. One of the strain gauges is in each instance fastened to opposite sides of this limb, which are loaded in bending or strain. The eight strain gauges are part of an electrical bridge circuit. A load-proportional signal generated with the help of the bridge circuit is communicated to an elevator control.

A possible problem with such a solution in that case is the high number of sensors and thus also the high number of signal connections within an evaluating circuit. Added to that is limited capability of access to the supports arranged under the elevator cage.

SUMMARY

At least some embodiments disclosed herein comprise a load measuring device which operates without a multiplicity of sensors and nevertheless has high measuring accuracy.

In particular embodiments, an elevator installation for the transport of persons or goods comprises an elevator cage with a support construction carrying the elevator cage, wherein the support construction has two beams, and a load measuring device having two sensors, which each generate a sensor signal in the case of loading, wherein each beam has a positioning arrangement, wherein each positioning arrangement has a material structure and wherein a first sensor is arranged at a first material structure and a second sensor at a second material structure so that a change in spacing at a material structure is converted into a change in a sensor signal generated by a sensor, wherein the sensors are so arranged that in the case of loading the first sensor detects a compression and the second sensor detects an expansion.

In at least some embodiments, two approximately identically loaded beams can each be equipped with a respective sensor. Signals of the two sensors are sufficiently pronounced that measurement errors at the same time not only cause small relative fluctuations in the respective sensor measurement value, but also can be compensated for in the course of evaluation of the signals of the two sensors.

In some embodiments of the elevator installation at least one of the positioning arrangements consists of two material structures. Thus, the signals of the two sensors can be matched to one another for the purpose of a simple evaluation. In some cases the sensor measurement values can thus be maximized.

In some embodiments of the elevator installation the positioning arrangements are arranged at a spacing in the same direction from a plane of a neutral axis of the corresponding beam. Rapid capability of access to the two sensors during maintenance or servicing of the elevator installation can be advantageous.

In some embodiments of the elevator installation a first positioning arrangement is arranged on a plane parallel to a neutral axis at the first beam, and a second positioning arrangement is arranged on a plane parallel to a neutral axis at a second beam. Through arrangement of the sensors parallel to the plane of the neutral axis maximum sensor measurement values can be generated for evaluation.

In further embodiments of the elevator installation the material structures are material interruptions. Material interruptions can be produced in simple and advantageous mode and manner. Changes in length detected by the sensors are nevertheless at a maximum.

The material structures are material removals in a development of the elevator installation. Regions of the beam, the positioning arrangements of which are characterized by material removals, can be loaded by external forces. Correspondingly, less material has to be processed for these beams.

In some embodiments of the elevator installation the positioning arrangements are respectively integrated in the surface of the beam. In some cases no additional elements have to be used as sensor beams.

A first one of the positioning arrangements is arranged at a side wall of a first beam and a second one of the positioning arrangements at a side wall of a second beam in some embodiments of the elevator installation. It is possible in this manner that the sensors arranged at the positioning arrangements do not project beyond an area spanned by the elevator cage and the beams. The sensors within the elevator installation are thus additionally protected during, for example, maintenance or a service.

In additional embodiments of the elevator installation the sensors are vibrating string sensors or strain gauges. Use of these sensor types can allow optimum evaluation of the changes in length due to compressions or expansions.

BRIEF DESCRIPTION OF THE DRAWINGS

The disclosure is explained in more detail by way of drawings and the following detailed description of different exemplifying embodiments, in which.

DETAILED DESCRIPTION

Figure 1:
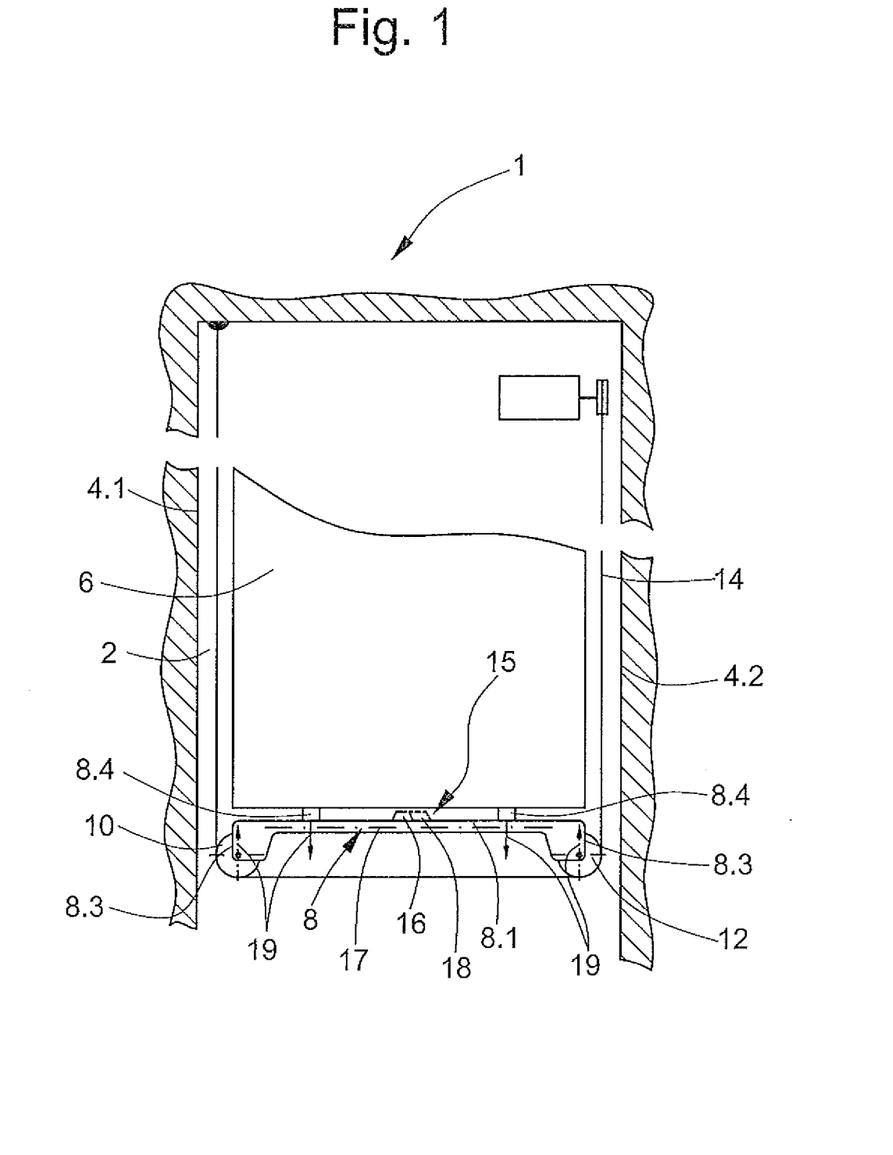
FIG. 1 shows a schematic illustration of an exemplary embodiment of an elevator installation in an elevator shaft with a first exemplifying embodiment of a load measuring device.

FIG. 1 schematically shows an exemplifying embodiment of an elevator installation 1 in an elevator shaft 2 with a first embodiment of a load measuring device 15. The elevator shaft 2 in the illustrated exemplifying embodiment is bounded by elevator shaft walls 4.1, 4.2; in another embodiment the elevator shaft can also have fewer shaft walls, for example in the case of a panorama elevator. The elevator installation 1 comprises an elevator cage 6, a support construction 8 carrying the elevator cage 6, cable rollers 10, 12 mounted below the illustrated lefthand and righthand edges of the elevator cage 6, and a support means 14. The support means 14 can be a round cable (for example of steel or aramide) with or without a casing, or a flat cable or flat rope with several tension carriers of steel embedded in a casing.

Figure 2:
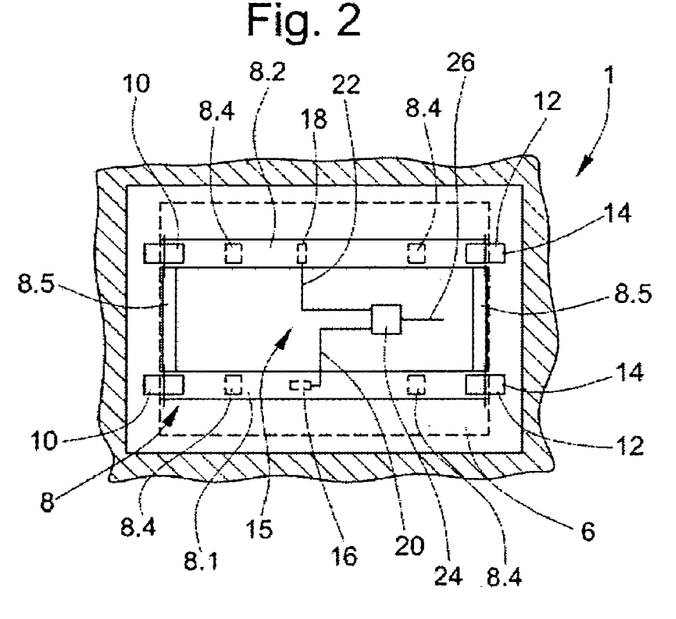
FIG. 2 shows an underneath view of an exemplary embodiment of an elevator cage with the load measuring device according to FIG. 1 and an associated evaluating unit.

The support construction 8 consists of two beams 8.1, 8.2, wherein the beam 8.2 is arranged behind the beam 8.1 and visible in FIG. 2. For better clarity, the two beams 8.1, 8.2 are illustrated in FIG. 2. The support construction 8 contains further cable roller bearings 8.3, cage support points 8.4 and beam connecting elements 8.5, which are illustrated in FIG. 2. In addition, two sensors 16, 18 which are part of the first exemplifying embodiment of the load measuring device are shown in FIG. 1.

It is known that beams, which are loaded transversely to an axis extending along a beam, can bend elastically. Running through the beam is a so-termed 'neutral axis' which represents a zone of a beam cross-section having an unchanging length during a bending process. Other zones are compressed or extended according to the respective position relative to this neutral axis. The neutral axis 17 of the beams 8.1, 8.2 is illustrated, to which reference is made in the description concerning FIG. 5.

The support means 14 supports the elevator cage 6 and is fixed at the top in the elevator shaft 2 (not illustrated) and runs vertically downwardly near the elevator shaft wall 4.1 to the cable roller 10. The support means 14 is so deflected by this cable roller 10 that it runs from there substantially horizontally below the elevator cage 6 until it is deflected vertically upwardly by the cable roller 12. From this cable roller 12 the support means 14 runs between the elevator cage 6 and the shaft wall 4.2, opposite the shaft wall 4.1, to a drive (not illustrated) located at the top in the elevator shaft 2. Also not illustrated are further components such as, for example, a counterweight and an elevator control, which are present in known exemplifying embodiments of an elevator installation.

Vertical force components 19, which from the cable rollers 10, 12 and the cage support points 8.4 act on the beams 8.1, 8.2 as a consequence of loading of the elevator cage 6, produce a load-proportional deformation of these beams 8.1, 8.2. The sensors 16, 18 detect these deformations and generate a corresponding sensor signal. Accordingly, deformation-sensors such as, for example, strain gauges or vibrating-string sensors can be used. In an exemplifying embodiment described here, use is made of vibrating-string sensors, for example of the company Digi Sens AG, Switzerland. The mode of function of a vibrating-string sensor is described further below in a selected exemplifying embodiment.

FIG. 2 shows, in an underneath view, the elevator installation 1 in the elevator shaft 2 of FIG. 1 with the elevator cage 6 illustrated in dashed lines and the beams 8.1, 8.2 as part of the support construction 8. The beams 8.1, 8.2 extend below a cage floor and each have a length approximately corresponding with a width of the cage floor. The cable rollers 10, 12, over which the support means 14 run, are fastened to the support construction 8. In addition to the beam 8.1 already illustrated in FIG. 1 and the cage support points 8.4 in the support construction 8, there can still be seen in FIG. 2 the beam connecting elements 8.5 and the beam 8.2. The beam connecting elements 8.5 are arranged at right angles to the beams 8.1, 8.2. They connect these beams 8.1, 8.2 and stabilize the support construction 8. The spacing of the two beams 8.1, 8.2 from one another is in this example approximately 9.5 meters. Depending on the respective size of the elevator cage 6 the spacing can be selected to be greater or smaller.

Also illustrated in FIG. 2 are the sensors 16, 18 of the load measuring device 15 and an associated evaluating unit 24. The evaluating unit 24 is illustrated below the elevator cage 6, but it can be arranged in terms of location anywhere in the elevator shaft 2 or in or near the elevator control. Signal connections 20, 22 from the sensors 16, 18 to the evaluating unit 24 and a signal connection 26 to the elevator control are also schematically illustrated. A different arrangement of the sensors 16, 18 in a middle region of the two beams 8.1, 8.2, which is discussed further below, can be seen.

Figure 3:
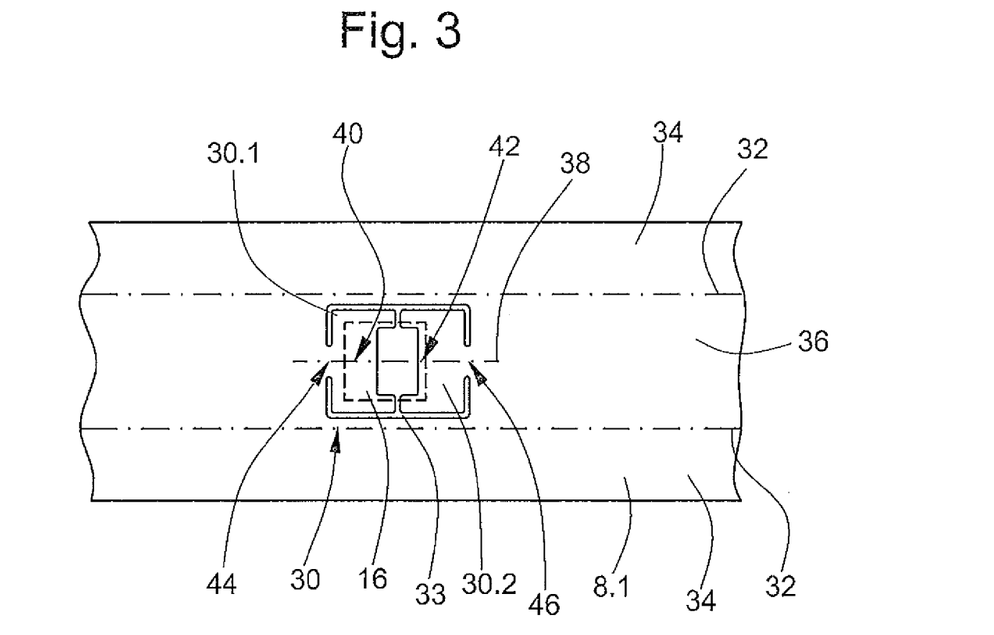
FIG. 3 shows, schematically, an exemplary embodiment of a center region of a beam with an indicated first sensor of the load measuring device according to FIG. 2.

A central region of the beam 8.1, which in the selected application according to FIG. 2 is a U-profiled section, is shown in FIG. 3 in a development. The beam 8.1 with a beam surface 36, outer edges 32 and side surfaces 34 can be seen. In addition, an axis 38 of symmetry, a positioning arrangement 30 consisting of material structures 30.1, 30.2, and the sensor 16 are illustrated. A material separation 33 bounds the material structures 30.1, 30.2. Boundary webs 44, 46 and sensor fastening regions 40, 42 can be seen within the positioning arrangement 30.

The beam 8.1, formed as a U-profiled section, is oriented substantially horizontally in the elevator shaft. At the outer edges 32 of the beam surface 36, the side surfaces 34 are bent downwardly so that they point away from the elevator cage 6 (or the floor underside thereof). The axis 38 of symmetry extends centrally along the beam surface 36. The positioning arrangement 30 is shown symmetrically along the axis 38 of symmetry on the beam surface 36. It includes the material structures 30.1, 30.2 and, according to the first exemplifying embodiment, is illustrated at a first position in the longitudinal direction of the beam 8.1. This first position lies approximately in the center of the length of the beam 8.1.

The material structures 30.1, 30.2 arise through material separations 33 (or material processing). Exemplifying embodiments of such material separations 33 are described further below. A part of the material separation 33 of the positioning arrangement 30 is similar to a depiction of a letter 'E', the longest limb of which is arranged at the edge 32 parallel to this edge 32. The part of the material separation 33 is enlarged at a center limb of the letter 'E' in the form of a rectangle, Through mirroring of this part of the material separation 33 at the axis 38 of symmetry there is obtained a complete image of the material separation 33.

The sensor fastening regions 40, 42 and the boundary webs 44, 46 are arranged within the positioning arrangement 30 on the material structures 30.1, 30.2. The sensor fastening regions 40, 42 and the boundary webs 44, 46 are disposed on the axis 38 of symmetry. The two boundary webs 44, 46 characterize outer boundaries of the positioning arrangement 30. The sensor 16 is fastened over an inner part of the material separation 33 at the sensor fastening regions 40, 42. The sensor 16 is indicated in dashed lines.

A change in length due to expansion or compression of material of the beam 8.1, 8.2 as a consequence of a changing load of the elevator cage 6 takes place relative to a considered spacing. This considered spacing is given by a path between the sensor fastening regions 40, 42. The spacing describes a measurement magnitude which is detected by the sensor 16 and converted into an electrical sensor signal.

Figure 4:
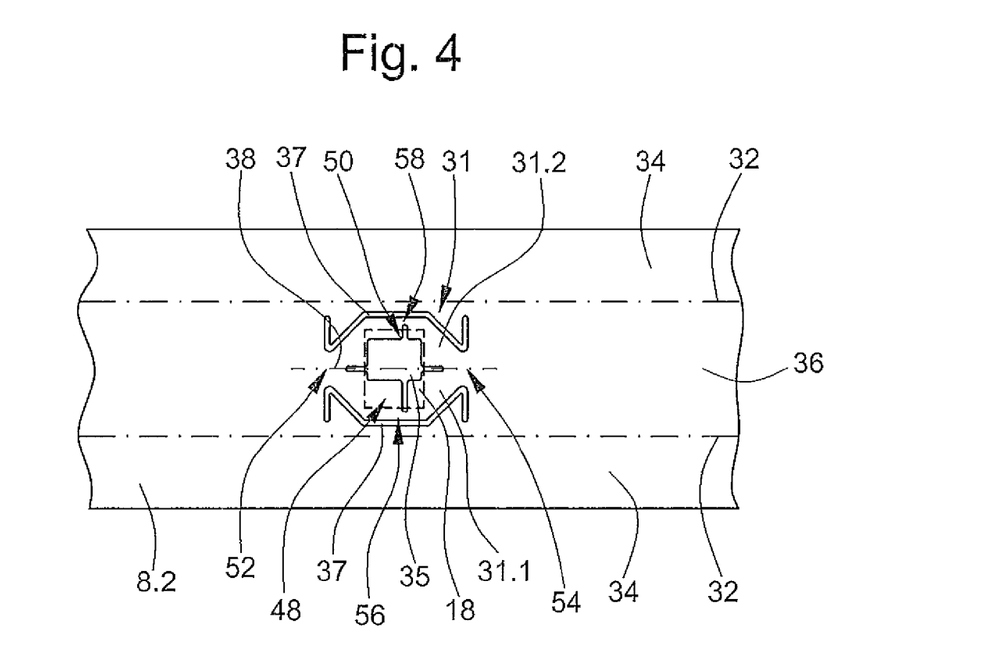
FIG. 4 shows, schematically, an exemplary embodiment of a center region of a further beam with an indicated second sensor of the load measuring device.

The positioning arrangements 30, 31 shown in FIGS. 3 and 4 respectively serve as a fastening position for the sensors 16, 18. The positioning arrangements 30, 31 are characterized by an intentional processing of the material so that a length change to be detected by the sensors 16, 18 is amplified. This material processing has a defined structure. Regions of this material processing are termed material separations 33, 35, 37.

The material separations 33, 35, 37 are so designed that in a region of this processing a cohesion of the material is locally at least partly removed or weakened so that the material separations 33, 35, 37 are characterized by a defined weakening of the material. The material can be interrupted or separated, for example by dividing, sawing or laser-cutting or achieved by other material separating methods. The material can also be narrowed by material removal, for example by etching or other materials for material removal or material weakening. In some cases, correspondingly processed regions can be filled out or filled up with a material which does not transmit forces to the full extent. This material, for example a resilient plastics material, is sometimes softer than the material of the beam 8.1.

The positioning arrangements 30, 31 can be formed directly in the beams 8.1, 8.2 (FIG. 3 or FIG. 4). Alternatively thereto, positioning arrangements 72, 74 shown in FIG. 5 can be fastened to the beam 8.1, 8.2 by means of additional components. This fastening can be carried out by screws, rivets, welding or other kinds of fastening. The material separations 33, 35, 37 in that case are selected so that a load-bearing property of the beams is not limited.

Increasing vertical force components 19, for example due to increasing loading of the elevator cage 6, produce a compression of the beam surface 36 along the axis 38 of symmetry. The material separations 33 have the effect that no deformation of the material occurs within the material structures 30.1, 30.2, since the material structures 30.1, 30.2 can move relative to one another. In the case of change in a spacing between the boundary webs 44, 46 a spacing of the material structures 30.1, 30.2 along the axis 38 of symmetry changes to the same extent. Thus, in the case of a load change this change of the spacing between the boundary webs 44, 46 corresponds with a change of a spacing between the sensor fastening regions 40, 42. The sensor 16 detects a measure of the compression which corresponds with the change in the spacing between the boundary webs 44, 46.

In the case of an exemplifying ratio of $$\frac{\text{Spacing between the boundary webs } 44, 46}{\text{Spacing between the sensor fastening regions } 40, 42} = 2$$

the sensor 16 detects twice the amount of compression as is given in accordance with the compression of the support surface 36 for the spacing of the sensor fastening regions 40, 42. The positioning arrangement 30 thus serves for amplification of the sensor signal generated by the sensor 16. This also applies to the sensor 18.

The possibility exists that changes in the signal strength due to temperature fluctuations lie in the same order of magnitude as changes in the signal strength due to expansions or compressions of comparable sensors. The amplification of the sensor signal in the case of changes in load can thus lead to a reduction in temperature influences, because the ratio of the signal strengths of temperature influence to loading decreases because of the signal-noise ratio.

A central region of the beam 8.2, which according to FIG. 2 is a U-profiled section, is shown in FIG. 4 in a development. An arrangement of FIG. 4 is completed by the arrangement according to FIG. 3 to form the mentioned first exemplifying embodiment.

Illustrated parts of the beam 8.2 are a beam surface 36, outer edges 32 and side surfaces 34. An axis 38 of symmetry, a positioning arrangement 31 consisting of material structures 31.1, 31.2, and the sensor 18 are shown on the support surface 36. Material separations 35, 37 bound these material structures 31.1, 31.2. Boundary webs 52, 54, edge regions 56, 58 and sensor fastening regions 48, 50 are illustrated on the material structures 31.1, 31.2.

The beam 8.2 is similarly arranged substantially horizontally in the elevator shaft 2. The beam surface 36 is bounded by the outer edges 32. At the outer edges 32 the side surfaces 34 are angled downwardly, i.e. point away from the elevator cage. The axis 38 of symmetry is illustrated centrally along the beam surface 36. The positioning arrangement 31 is shown on the support surface 36 almost symmetrically with respect to this axis 38 of symmetry. The positioning arrangement 31 consists of the material structures 31.1, 31.2.

In the illustrated exemplifying embodiment a depiction of a component of the material separation 37 is similar to an exaggeratedly wide letter 'M' when in each instance the component of this material separation 37 lying close to the edge 32 is taken into consideration. Through mirroring of these components of the material separation 37 at the axis 38 of symmetry, the material separation 37 can be imaged. The material separation 35 is arranged in a center of the positioning arrangement 31. A depiction of the material separation 35 has a form of a rectangle with webs pointing outwardly at right angles at the sides thereof. The respective mutually opposite webs are disposed in the course of a notional line. In that case, two of these webs run along the axis 38 of symmetry.

The sensor fastening regions 48, 50, the boundary webs 52, 54 and the edge regions 56, 58 within the positioning arrangement 31 are illustrated in FIG. 4. The two boundary webs 52, 54 characterize outer boundaries of the positioning arrangement 31 along the axis 38 of symmetry. The sensor fastening regions 48, 50 are positioned along an axis running at right angles to the axis 38 of symmetry. This axis runs through a geometric center point of the positioning arrangement 31.

The two edge regions 56, 58 are illustrated on this axis at outermost points within the positioning arrangement 31. For the sake of better clarity the sensor 18 arranged over the material separation 35 is illustrated in dashed lines. The sensor 18 is fastened to the sensor fastening regions 48, 50.

The positioning arrangement 31 is present at a second position in longitudinal direction of the beam 8.2. For direct comparability of the sensor signals, in this exemplifying embodiment the first and second positions are selected to be identical in longitudinal direction of the beams 8.1, 8.2. In its disposition in the center of the beam 8.2 the sensor 18 is arranged on the beam 8.1 at right angles to the sensor 16 according to FIG. 3. An arrangement of the sensors 16, 18 in the central region of the beams 8.1, 8.2 produces in this example "optimized" (referring to the signal strength) sensor signals.

The beam surface 36 in the case of increasing loads in the elevator cage 6 is compressed in longitudinal direction of the beam 8.2. The compression takes place along the axis 38 of symmetry. This compression produces an expansion between the two edge regions 56, 58. The material structures 31.1, 31.2 promote an increased size of the expansion between the sensor fastening regions 48, 50. Expansion or compression of the material along the axis between the two edge regions 56, 58 is generally possible only to a small degree on the material structures 31.1, 31.2. The material separations 35, 37 accordingly produce, analogously to FIG. 3, equally an apparently larger spacing of the sensor fastening regions 48, 50 from one another. The combination of the positioning arrangements 30, 31 (FIG. 3, FIG. 4) has the effect that the sensor 16 detects a compression to the same degree as the sensor 18 detects an expansion.

Figure 5:
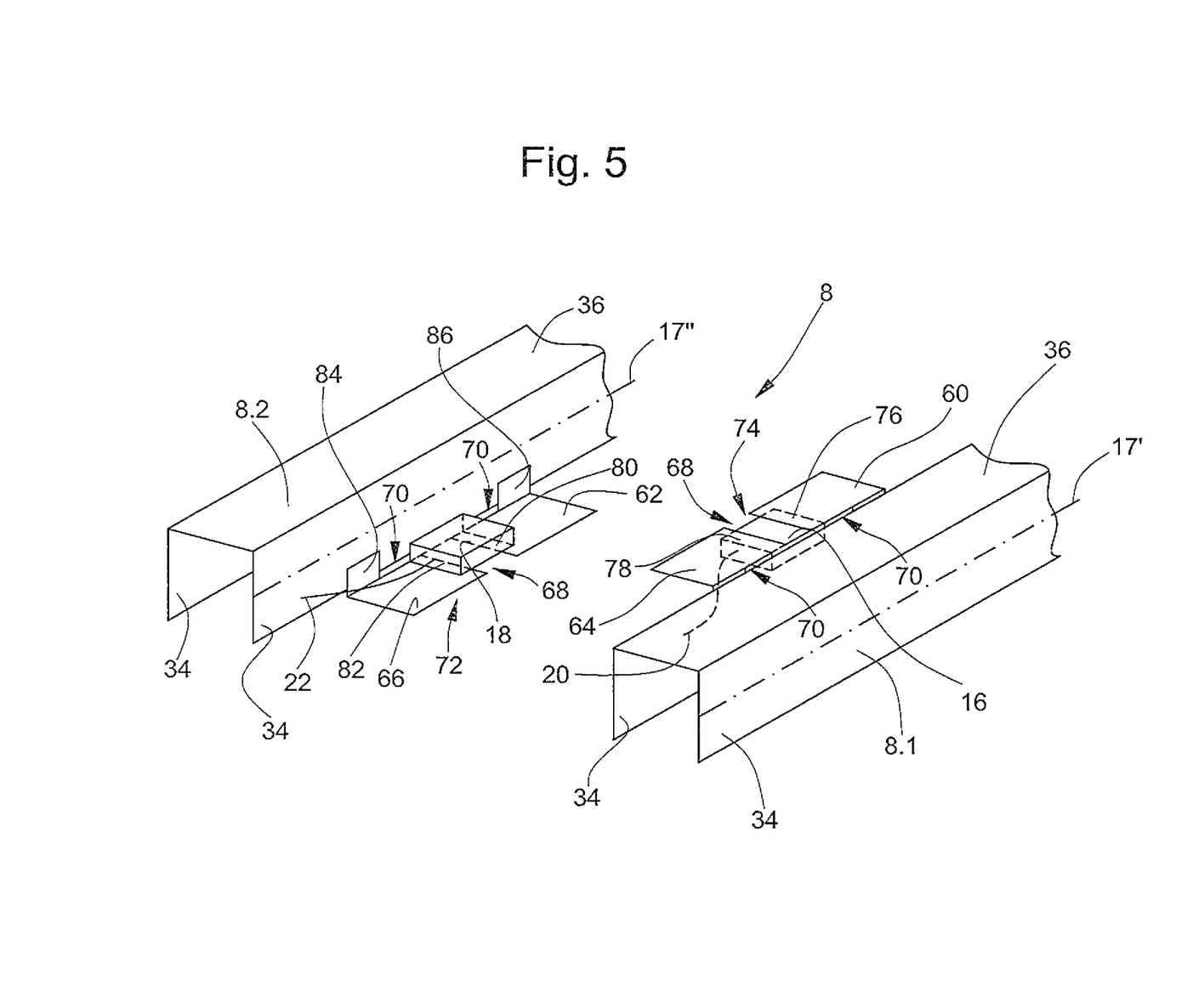
FIG. 5 shows a perspective illustration of two beams of a support construction with a load measuring device according to a second exemplifying embodiment of a load measuring device.

FIG. 5 shows a further exemplifying embodiment of the load measuring device. Illustrated are the beams 8.1, 8.2 of the support construction 8. Support surfaces 36 and side surfaces 34 are visible. A plane of a neutral axis 17 is indicated by lines 17', 17". The material structures in this exemplifying embodiment are excluded as sensor beams. Positioning arrangements 72, 74, sensor carriers 60, 62, 64, 66, fastenings 84, 86, material separations 68, 70, sensor fastening regions 76, 78, 80, 82, two sensors 16, 18 and signal connections 20, 22 can be seen.

A respective one of the two positioning arrangements 72, 74 is mounted on each of the beams 8.1, 8.2. In that case the positioning arrangement 74 is fastened to one of the side surfaces 34 of the beam 8.1. The positioning arrangement 72 is fastened to another one of the side surfaces 34 of the beam 8.2 so that the positioning arrangements 72, 74 are arranged oppositely. The positioning arrangements 72, 74 are arranged at the beams 8.1, 8.2 at a spacing symmetrically from the neutral axis 17.

The positioning arrangement 72 consists of two sensor carriers 62, 66. The sensor carriers 62, 66 are fastened to the fastenings 84, 86 at the side surface 34 of the beam 8.2. The positioning arrangement 72 is characterized by material separations 68, 70. The material separation 68 in the illustrated example is represented as an interruption between the sensor carriers 62, 66. The sensor 18 is arranged over the material separation 68. The sensor 18 is connected at the sensor fastening regions 80, 82 with the positioning arrangement 72. The signal connection 22 transmits a sensor signal to an evaluating unit. The sensor 16 is connected in identical mode and manner with the beam 8.1.

The sensor 16 detects a compression and the sensor 18 detects a corresponding expansion in the case of increase in the vertical force components 19. The material separations 70 correspond in their basic function with the material separations 33, 37 shown in FIGS. 3 and 4. No forces act on the sensor carriers 62, 66 along an axis determined by the sensor fastening regions 80, 82. The material separations 68, 70 thus produce an apparently larger spacing of the sensor fastening regions 40, 42 from one another. This apparently larger spacing thus corresponds with a path between the fixed points 84, 86. Correspondingly, a multiple of a deformation, which in at least some cases would be decisive for the spacing of the sensor fastening regions 80, 82, is detected.

In the selected exemplifying embodiments the deformation is detected by vibrating-string sensors. The vibrating-string sensor has a vibrating string as an essential element. With the help of an electronic excitation system mounted at the vibrating-string sensor this vibrating string is excited into vibration. Use is made of an excitation voltage, by way of example, of $U=5V$. At a zero load balance point of the vibrating-string sensors the vibration frequency is determined as zero load. Thereafter, loading of the elevator cage 6 can be determined in, for example, a linear dependence on the then prevailing vibration frequency of the vibrating string. A change in a tension force of the vibrating string, for example due to a change in loading of the elevator cage 6, leads to a change in the vibration frequency of the vibrating string. This change in the vibration frequency is evaluated in order to determine the load. The electronic excitation system amplifies a signal oscillating at this vibration frequency and converts it into a rectangular signal of the same oscillation frequency. This rectangular signal is then evaluated in the electronic evaluation system in order to determine the loading of the elevator cage 6.

Figure 6A:
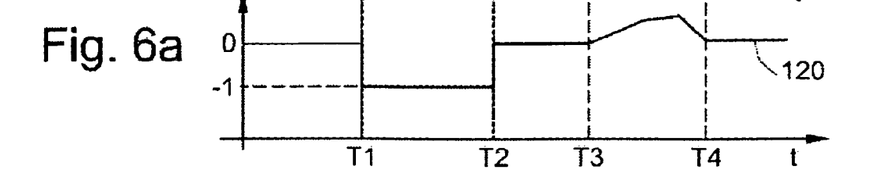
FIGS. 6a, 6b, 6c show signal plots over time of the two individual sensors (a, b) according to FIGS. 2 to 5 and an overall signal (c) resulting therefrom.
Figure 6B:
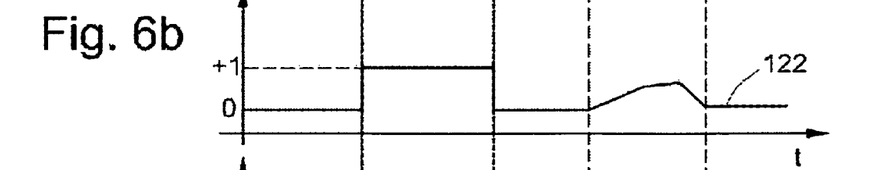
Figure 6C:
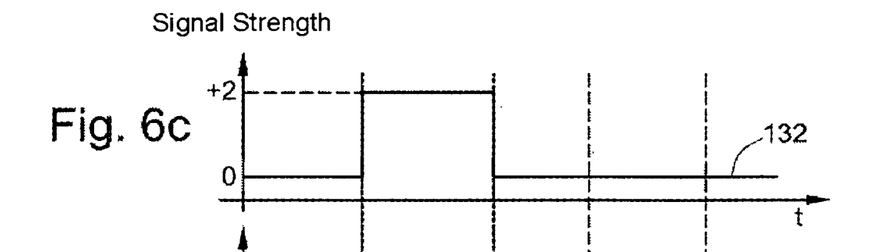

Illustrated in FIGS. 6a, 6b, 6c are three exemplifying signal plots 120, 122, 132, which each show a signal strength over time t. Changes in the signal strength in the signal plots 120, 122, 132 are characterized by amount and direction of the change.

FIG. 6a shows the signal plot 120 of a signal of the sensor 16. Up to a time instant T1, between time instants T2, T3, and after a time instant T4 the signal strength is approximately zero. In a time period bounded by the time instants T1, T2 the elevator cage 6 is subjected to a loading. At the time instant T1 the elevator cage 6 is loaded and at the time instant T2 relieved of load. The signal strength thereby changes; in the illustrated exemplifying embodiment the signal strength drops at the time instant T1 to approximately −1. The signal strength is constant between the time instants T1, T2 and rises at the time instant T2 to approximately zero.

FIG. 6b shows the signal plot 122 of a signal of the sensor 18 in the case of loading. This signal plot 122 runs up to the time instant T1 and after the time instant T2 identically to the signal plot 120. Due to the loading between the time instants T1, T2 the signal strength changes. In the illustrated exemplifying embodiment the signal strength rises at the time instant T1 to approximately +1 and runs constantly up to the time instant T2. The signal strength drops at the time instant T2 back to approximately zero. A compression of the first one of the two sensors 16, 18 and an expansion of the second one of the two sensors 16, 18 cause reciprocal signs for the changes in the signal strength due to the loading.

FIG. 6c shows the signal plot 132 as a result of an evaluation of the signal plots 120, 122 in an evaluating unit 24. In simple terms this signal plot 132 corresponds with subtraction of the two signal plots 120, 122. The signal strength rises at the time instant T1, due to the loading, to approximately +2. The signal strength is constant between the time instants T1, T2 and drops at the time instant T2 to approximately zero. At all other time instants in the illustrated exemplifying embodiment the signal strength is approximately zero.

In order to explain an influence of disturbances on a sensor signal, the changes in signal strength are shown, by way of example, due to temperature fluctuations between the time instants T3, T4 (FIGS. 6a, 6b, 6c). The signal strength of the signal plots 120, 122 changes continuously between these time instants T3, T4. The signal strength between the time instants T3, T4 in the illustrated FIGS. 6a, 6b is approximately identical because present between the two beams 8.1, 8.2 or the sensors 16, 18 is, by way of example, a small selected spacing of approximately 0.5 meters and thus the two sensors are exposed to almost the same temperature. The temperature thus has an equal effect on the two sensors 16, 18. The evaluation of the signal plots 120, 122 in the evaluating unit 24 produces a compensation for temperature fluctuations.

For calibration of the load measuring device 15 three constants are determined. A first one of the three constants describes a position of the elevator cage 6 in the elevator shaft 2. On determination of this first constant a mass of the elevator cage 6 without loading is measured at two different locations in the elevator shaft 2. This first constant is determined on the basis of differences between values of such a measurement.

A second constant reproduces a dependence of a frequency of the sensor signals with respect to a mass of the loading. The second constant is determined by means of the zero load balance point. This second constant is determined for the two sensors 16, 18 at an identical position of the elevator cage 6 in the elevator shaft 2 and with the help of a resulting frequency of the sensor signals at a defined loading by comparison with a reference frequency without loading.

A third constant places the temperature fluctuations into relationship with frequency changes in the sensor signals at constant loading.

In one exemplifying embodiment, values of, for example, approximately 2 kgPC result for these constants. The signal plot 132 is calculated in the evaluating unit 24 with the help of the reference frequencies of the sensor signals, which relate to the elevator cage 6 without loading, the three constants and the signal plots 120, 122 of the sensors 16, 18.

In at least some cases, an advantage of the exemplifying embodiments shown here is that only a small number of two sensors 16, 18 is used. As a consequence thereof there is a small outlay on connection of these sensors 16, 18 with the evaluating unit 24. A further potential advantage is that compensation is also provided for temperature influences. The selective amplification of the sensor signals due to the load to be detected minimizes the influence of disturbances.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. We therefore claim as our invention all that comes within the scope and spirit of these claims.

We claim:
1. An elevator installation, comprising:
an elevator cage;
a support construction bearing the elevator cage, the support construction comprising first and second beams, each of the first and second beams having a top surface and side surfaces extending from the top surface, the side surfaces having substantially vertical orientation;
first and second sensors;
respective material structures at each of the first and second beams, the material structures extending in a direction away from the vertically oriented side surfaces of each of the respective first and second beams, the first sensor being arranged at the material structure at the first beam and the second sensor being arranged at the material structure at the second beam, a change in spacing at the material structure at the first beam being measurable by the first sensor, and a change in spacing at the material structure at the second beam being measurable by the second sensor, the first and second sensors being the only sensors arranged at the first and second beams for sensing the change in spacing, the first sensor detecting a compression of the first beam in response to loading of the support construction and the second sensor detecting an expansion of the second beam in response to the loading, the material structures formed to compensate for temperature influences by amplifying sensor signals generated by the first and second sensors in response to the detection of the compression and expansion respectively.

2. The elevator installation of claim 1, a neutral axis of the first beam and a neutral axis of the second beam defining a plane, the material structure at the first beam and the material structure at the second beam being equidistant from the plane.

3. The elevator installation of claim 1, the material structure at the first beam being arranged in a plane parallel to a neutral axis of the first beam, and the material structure at the second beam being arranged in a plane parallel to a neutral axis of the second beam.

4. The elevator installation of claim 1, the material structure at the first beam and the material structure at the second beam comprising respective separations formed in the material.

5. The elevator installation of claim 1, the first and second sensors comprising vibrating string sensors.

6. The elevator installation of claim 1, the first and second sensors comprising strain gauges.

7. The elevator installation of claim 1, wherein the material structure at the first beam and the material structure at the second beam extend in a direction toward each other.

8. An elevator installation component, comprising:
a support construction configured to receive an elevator cage, the support construction comprising first and second beams, each of the first and second beams having a top surface and side surfaces extending from the top surface, the side surfaces having substantially vertical orientation;
first and second sensors;
respective material structures at each of the first and second beams, the material structures extending in a direction away from the vertically oriented side surfaces of each of the respective first and second beams, the first sensor being arranged near the material structure at the first beam and the second sensor being arranged near the material structure at the second beam, a change in spacing at the material structure at the first beam being measurable by the first sensor, and a change in spacing at the material structure at the second beam being measurable by the second sensor, the first and second sensors being the only sensors arranged at the first and second beams for sensing the change in spacing, the first sensor detecting a compression of the first beam in response to loading of the support construction and the second sensor detecting an expansion of the second beam in response to the loading, the material structures formed to compensate for temperature influences by amplifying sensor signals generated by the first and second sensors in response to the detection of the compression and expansion respectively.

9. The elevator installation of claim 8, wherein the material structure at the first beam and the material structure at the second beam extend in a direction toward each other.

10. An elevator installation for transport of persons or goods, comprising:
   an elevator cage;
   a support construction carrying the elevator cage, wherein the support construction has two beams, each of the two beams having a top surface and side surfaces extending from the top surface, the side surfaces having substantially vertical orientation; and
   a load measuring device having two sensors that in the case of load each generate a respective sensor signal,
   wherein each beam has a positioning arrangement, wherein each positioning arrangement has a material structure, wherein each material structure extends in a direction away from the vertically oriented side surfaces of each of the beams, and wherein a first sensor is arranged at a first material structure and a second sensor at a second material structure, so that a change in spacing at one material structure is converted into a change of a sensor signal produced by a sensor, the first and second sensors being the only sensors arranged at the beams for sensing the change in spacing,
   wherein the sensors are so arranged that, in the case of loading of the support construction, the first sensor detects a compression of one of the beams in response to the loading and the second sensor detects an expansion of another of the beams in response to the loading, the material structures formed to compensate for temperature influences by amplifying the sensor signals generated by the first and second sensors in response to the detection of the compression and expansion respectively.

* * * * *